(12) United States Patent
De Wergifosse et al.

(10) Patent No.: US 12,397,901 B2
(45) Date of Patent: Aug. 26, 2025

(54) ELECTROHYDRAULIC PITCH-CONTROL SYSTEM WITH A VALVE PUMP IN A ROTATING REFERENCE FRAME

(71) Applicant: Safran Aircraft Engines, Paris (FR)

(72) Inventors: Huguette De Wergifosse, Moissy-Cramayel (FR); Jacques Auriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 13 days.

(21) Appl. No.: 18/564,446

(22) PCT Filed: May 20, 2022

(86) PCT No.: PCT/FR2022/050966
§ 371 (c)(1),
(2) Date: Nov. 27, 2023

(87) PCT Pub. No.: WO2022/248796
PCT Pub. Date: Dec. 1, 2022

(65) Prior Publication Data
US 2024/0253771 A1    Aug. 1, 2024

(30) Foreign Application Priority Data
May 28, 2021 (FR) ..................... 2105565

(51) Int. Cl.
*B64C 11/38* (2006.01)
*F15B 1/02* (2006.01)
(Continued)

(52) U.S. Cl.
CPC ............ *B64C 11/385* (2013.01); *F15B 1/022* (2013.01); *F15B 1/033* (2013.01); *F15B 9/09* (2013.01);
(Continued)

(58) Field of Classification Search
CPC .......... F15B 1/022; F15B 1/024; F15B 1/033; F15B 9/03; F15B 9/09; F15B 15/18
See application file for complete search history.

(56) References Cited

U.S. PATENT DOCUMENTS 6,767,187 B2    7/2004  Franchet et al.
7,874,801 B2 *  1/2011  Schmidt ................ F04D 29/362
                                                    416/157 R
(Continued)

FOREIGN PATENT DOCUMENTS

EP          1 306 558 A1    5/2003

*Primary Examiner* — Michael Leslie
(74) *Attorney, Agent, or Firm* — Birch, Stewart, Kolasch & Birch, LLP (57) ABSTRACT

The present invention relates to a pitch-change mechanism for a turbine engine propeller, said turbine engine comprising a stator portion and a rotor portion, said pitch-change mechanism comprising an electrohydraulic actuator comprising: —a cylinder for actuating the propeller, comprising a first chamber and a second chamber; —a hydraulic pump suitable for selectively supplying the first chamber or the second chamber of the cylinder with pressurized hydraulic fluid; —a hydraulic fluid reservoir configured to store a pressurized hydraulic fluid; —a valve controlled between a first position in which the valve places the first chamber of the cylinder in fluid communication with the hydraulic pump, and a second position in which the valve places the first chamber of the cylinder in fluid communication with the hydraulic fluid reservoir.

18 Claims, 5 Drawing Sheets

(51) Int. Cl.
*F15B 1/033* (2006.01)
*F15B 9/09* (2006.01)

(52) U.S. Cl.
CPC .................. *F15B 2211/212* (2013.01); *F15B 2211/30565* (2013.01); *F15B 2211/31535* (2013.01)

(56) References Cited

U.S. PATENT DOCUMENTS

| | | | | |
|---|---|---|---|---|
| 9,850,916 | B2 * | 12/2017 | Helbig | ................ F03D 7/04 |
| 10,344,784 | B2 * | 7/2019 | Peterson | ................ F15B 1/033 |
| 10,962,032 | B2 * | 3/2021 | Zeller | ................ F15B 11/17 |
| 11,180,244 | B2 * | 11/2021 | Evans | ................ F15B 15/06 |
| 2010/0071543 | A1 | 3/2010 | Mamei et al. | |
| 2020/0086015 | A1 | 3/2020 | Zeller et al. | |

* cited by examiner

ELECTROHYDRAULIC PITCH-CONTROL SYSTEM WITH A VALVE PUMP IN A ROTATING REFERENCE FRAME

TECHNICAL FIELD

The disclosure relates to the field of turbine engines comprising a propeller or a fan with variable pitch setting. More specifically, the disclosure relates to a system for actuating the pitch of a propeller or a fan of such a turbine engine.

BACKGROUND

Different turbine engine architectures use a propeller (turboprop, open rotor) or a fan (turbojet engine) with variable pitch setting. This variability allows the turbine engine to adapt to variable flight conditions by maintaining a favorable angle of incidence of the air on the vanes. The pitch setting variability is particularly necessary for rotors with a low compression ratio, such as turboprop propellers and turbine engine fans with a high bypass ratio (ratio between the flow rate of the secondary (cold) stream and the flow rate of the primary stream (which passes through the primary spool)).

Multiple pitch change mechanisms have been designed to vary the pitch of the vanes of a propeller or a fan. These mechanisms generally include a rotation of the vane around its main axis via kinematics, for example a connecting rod—jack-actuated eccentric assembly. The jack is supplied with hydraulic fluid (for example oil) coming from a lubrication group of the turbine engine, the variation in the hydraulic fluid pressure delivered as well as the distribution of the fluid in either of the chambers of the jack make it possible to vary the pitch of the vanes. In order to transfer the supply of hydraulic fluid to the pitch change mechanism from a fixed reference frame (lubrication unit) of the turbine engine to a rotating reference frame (of the fan), an OTB (Oil Transfer Bearing) is generally used. In a manner known per se, the OTB comprises a fixed portion relative to a stator portion of the turbine engine and which is connected, via dedicated pipes, to a servovalve and to a pump, itself connected to the engine lubrication circuit comprising the lubrication group and an oil tank and a pump, and a rotating portion which is secured in movement to a rotor portion of the turbine engine. However, the OTB is a complex and fragile device, capable of generating malfunctions, in particular significant oil leaks affecting the reliability and performance of the turbine engine and requiring the installation of recovery pumps and an oversizing of the engine oil system. The supply of pressurized oil to this device is always problematic, because in general to provide a high power density, hydraulic pumps driven by one of the shafts of the turbine engine are used. Moreover, this configuration presents operating limitations at low rpm since it is dependent on the rpm of the high-pressure body of the turbine engine and can be subject to boost problems during some maneuvers since it is dependent on the supply of the engine oil circuit. For example, when the turbine engine is close to being stopped (in the process of being stopped, during startup, or stopped) it may be necessary either to actuate or to maintain the pitch setting, which generally requires the use of an additional independent (generally electrically powered) pump, and a pitchlock. Finally, this configuration requires a system for protecting against a closing of the pitch setting of the blades in flight following a hydraulic failure. Other alternatives can be envisaged: a system for locking the pitch of the vanes (pitch lock) or a counterweight system to ensure the feathering of the blades (opening of the pitch to reduce drag). These two systems are heavy, complex, and expensive and can generate other cases of failure such as the untimely blocking of the pitch setting.

In addition, as the operation of the lubrication group is generally linked to the operation of the turbine engine, it is necessary to provide for auxiliary systems in order to ensure some protection functions, in particular in case of overspeed or engine shutdown. It is therefore necessary to provide for a functional feathering system even in the absence of hydraulic fluid pressure.

On the other hand, the pitch change mechanism must be able, engine off, to ensure the exit from the feathering position.

SUMMARY

One aim is to propose a turbine engine with variable pitch setting which overcomes the disadvantages of the prior art mentioned below.

Subsidiarily, an aim is to propose an independent pitch change mechanism which overcomes the difficulties related to the transfer of hydraulic fluid from a fixed reference frame to a rotating reference frame.

Subsidiarily, an aim is to propose a pitch change mechanism which can be used whatever the operation of the turbine engine, which is also capable of ensuring the functions of protection and feathering of the vanes of the propeller/the fan of the turbine engine, preferably without being affected by possible failures of the rotating electrical transfer.

Subsidiarily, an aim of the invention is to propose a pitch change mechanism which can be implemented in a turboprop or open rotor type turbine engine comprising a propeller and a turbojet engine comprising a fan.

According to a first aspect, a mechanism for changing the pitch of a turbine engine propeller, said turbine engine comprising a stator portion and a rotor portion, said pitch change mechanism comprising an electrohydraulic actuator comprising:
- a jack for actuating the propeller, comprising a first chamber and a second chamber;
- a hydraulic pump adapted to selectively supply the first chamber or the second chamber of the jack with pressurized hydraulic fluid;
- a hydraulic fluid tank configured to store a pressurized hydraulic fluid;
- a valve controlled between a first position, in which the valve puts the first chamber of the jack in fluid communication with the hydraulic pump, and a second position in which the valve puts the first chamber of the jack in fluid communication with the hydraulic fluid tank.

Embodiments of the first aspect comprise, taken alone or in any one of their technically possible combinations:
- the mechanism further comprising an additional hydraulic fluid tank, the valve being controlled by a pressure of said additional hydraulic fluid tank;
- the valve is controlled from the first position to the second position when the pressure of the additional hydraulic fluid tank is below a predetermined threshold;
- a pressure of the hydraulic fluid tank is greater than the pressure of the additional hydraulic fluid tank;
- the additional hydraulic fluid tank is mounted in a rotating reference frame of the turbine engine;

the mechanism further comprising a pressure relief valve and/or an additional valve configured to put the second chamber of the jack in fluid communication with the additional hydraulic tank when the additional valve is in the second position;

the pressure relief valve and/or the additional valve are controlled by the pressure of the additional fluid tank;

the mechanism further comprising an additional pressure relief valve configured to put the first chamber of the jack in fluid communication with the additional hydraulic fluid tank when the pressure of the first chamber of the jack is above a predetermined threshold;

the hydraulic fluid tank is mounted in a rotating reference frame of the turbine engine;

the body of the pump is in a rotating reference frame of the turbine engine and one among the inclined plate and the barrel of the pump is in a fixed reference frame of the turbine engine;

in the absence of rotation between the fixed reference frame and the rotating reference frame, the pump has zero flow rate;

the mechanism further comprising a flow rate reversal valve configured to selectively put the hydraulic pump in fluid communication with the first chamber or the second chamber of the jack;

the hydraulic pump is reversible.

PRESENTATION OF THE FIGURES

Other characteristics and advantages will appear upon reading the following description of a preferred embodiment. This description will be given with reference to the appended drawings in which.

DETAILED DESCRIPTION

Figure 1:
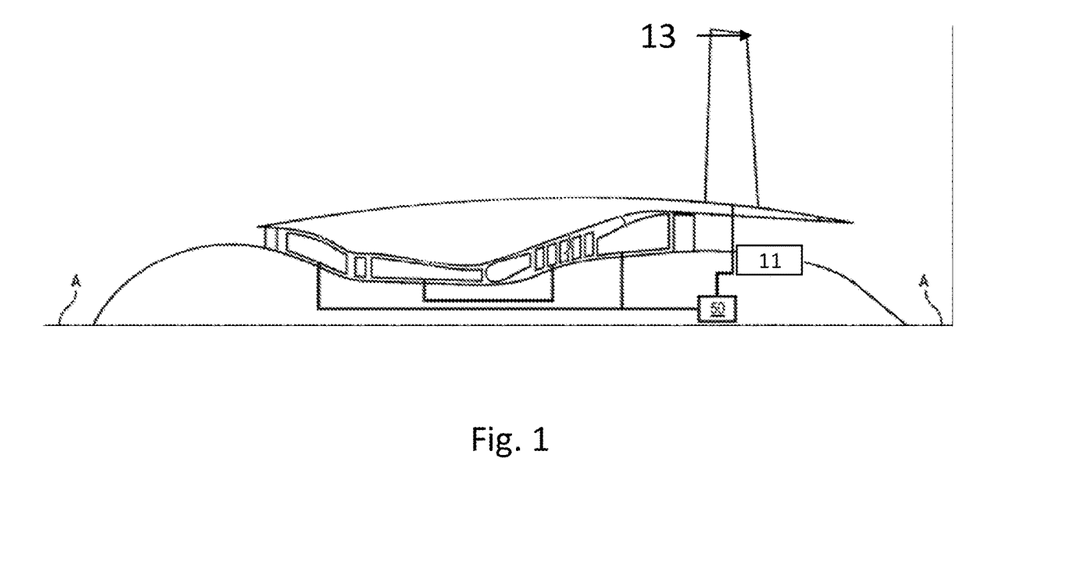
FIG. 1 is a schematic sectional view of one example of a turbine engine comprising a fan or a propeller with variable pitch setting and a pitch change mechanism in accordance with one embodiment.

The present disclosure applies to any variable-pitch turbine engine comprising a pitch change mechanism. Particularly, the disclosure relates to both turbofan turbojet engines comprising a fan and propeller turbine engines such as turboprops or open rotors (unducted propeller) as represented in FIG. 1, whose pitch of the vanes of the fan or of the propeller can be modified depending on flight conditions. In the remainder of the application, for the sake of simplification of the description and the claims, the term "propeller" will be used both to designate a propeller as described above or a fan of a turbojet engine.

Figure 2:
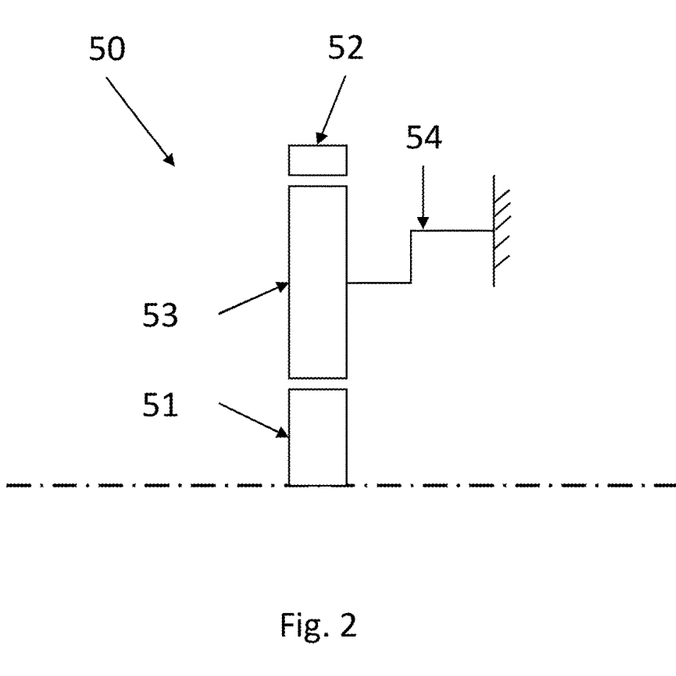
FIG. 2 is a partial and schematic sectional view of one exemplary embodiment of a planetary type mechanical reduction gear which can be used in a turbine engine comprising a pitch change mechanism in accordance with one embodiment of the invention.

The turbine engine comprises, in addition to the propeller, a mechanical reduction gear 50, as illustrated in FIG. 2, configured to drive in rotation the propeller. The reduction gear 50 is housed in a casing of the turbine engine. The turbine engine is configured to be fixedly mounted on an aircraft via suitable fixing means, such as a pylon. In what follows, a stator portion of the turbine engine will be designed as any portion fixedly mounted on a portion of the turbine engine which is fixed relative to the casing which is configured to be connected to the pylon, and a rotor portion of the turbine engine will be designed as any portion which is movable around an axis when the turbine engine is in operation and which, by definition, is therefore movably mounted relative to the stator portion. For example, the stator portion comprises the casing of the turbine engine in which means for driving the propeller are housed, etc. The rotor portion comprises for example the propeller and its drive shaft.

Finally, in the present application, the upstream and the downstream are defined in relation to the normal flow direction of the gas in and through the propeller. Moreover, axis A of the hydraulic pump refers to its axis of rotation. The axial direction corresponds to the direction of the axis A and a radial direction is a direction perpendicular to this axis and passing therethrough. Moreover, the circumferential (or lateral) direction corresponds to a direction perpendicular to the axis A and not passing therethrough. Unless otherwise specified, inner and outer, respectively, are used with reference to a radial direction so that the inner portion or face of an element is closer to the axis A than the outer portion or face of the same element. In addition, an element is considered to be "in a fixed reference frame" when it is kept immobile in rotation relative to the axis A, while it is considered "in a rotating reference frame" when it is capable of being driven in rotation relative to the axis A.

The reduction gear 50 is of the planetary type and comprises:

a sun gear 51, centered on an axis of rotation of the reduction gear and configured to be driven in rotation by a drive input shaft of the turbine engine, a ring gear 52, coaxial with the sun gear 51 and configured to drive in rotation the drive shaft of the propeller around the axis of rotation, and a series of planet gears 53 circumferentially distributed around the axis of rotation of the reduction gear between the sun gear 51 and the ring gear 52, each planet gear being meshed internally with the sun gear 51 and externally with the ring gear 52. The series of planet gears 53 is mounted on a planet gear carrier 54 which is fixed relative to a stator portion of the turbine engine.

Alternatively, the reduction gear 50 can be epicyclic, in which case the ring gear 52 is fixedly mounted on a stator portion of the turbine engine and the drive shaft is driven in rotation by the planet gear carrier 54.

Figure 3:
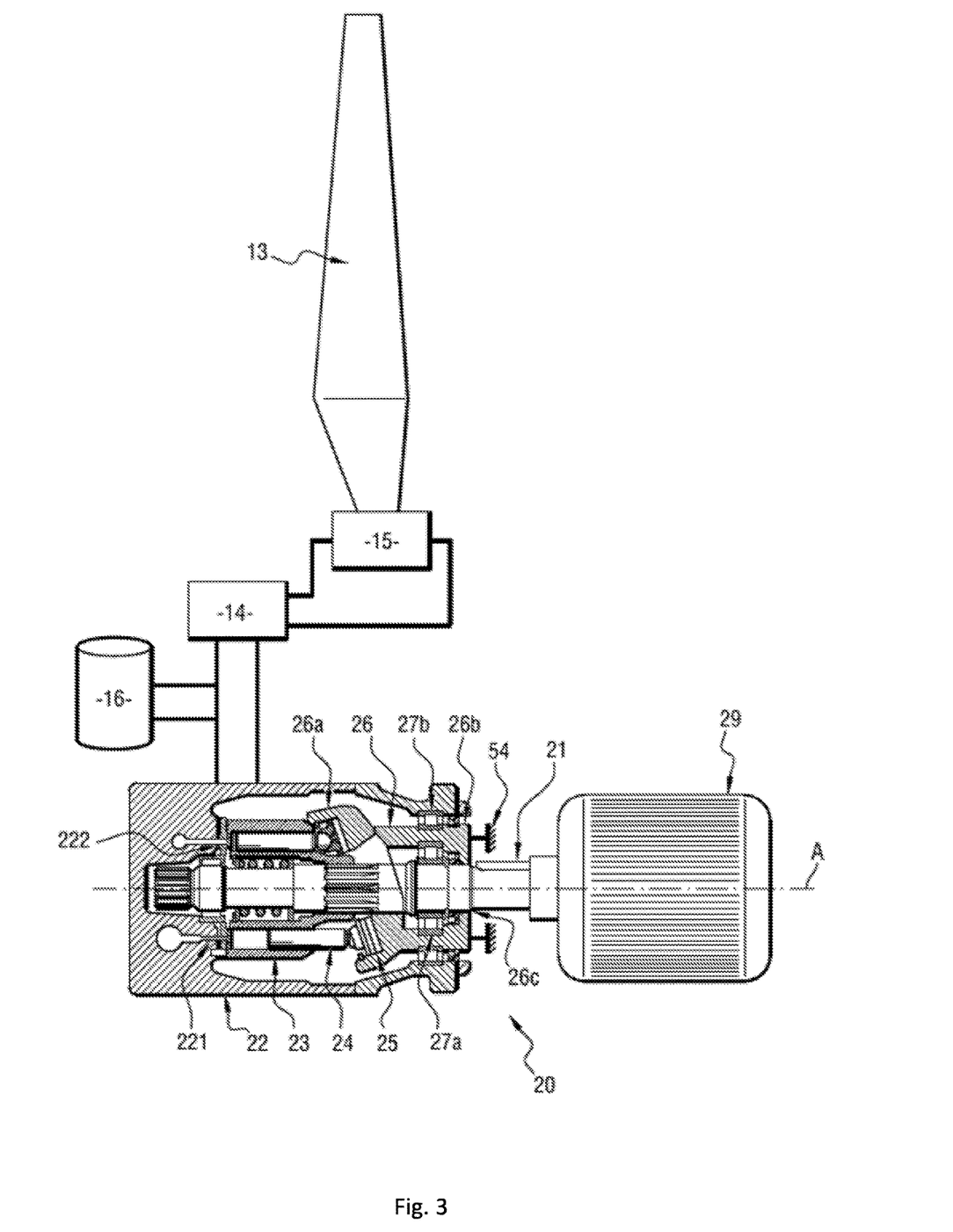
FIG. 3 is a schematic sectional view of one example of a turbine engine comprising a fan or a propeller with variable pitch setting and a pitch change mechanism using a non-reversible hydraulic pump in accordance with one embodiment.

In one embodiment illustrated in FIG. 3, the pitch change mechanism comprises an electrohydraulic actuator 11 (EHA), configured to actuate a jack 15 which is mechanically connected to the propeller 13 in order to modify its pitch, a hydraulic pump 20 configured to pressurize a fluid (typically oil) and an electric machine 29.

The electric machine 29 is fixedly mounted on the stator portion of the turbine engine and comprises an actuation shaft 21 movable in rotation around an axis of rotation A.

The jack 15 preferably comprises a double-acting jack comprising a first chamber 151 and a second chamber 152 successively powered by the hydraulic pump 20. The actuation of the hydraulic pump 20 by the electric machine 29 therefore has the effect of filling (respectively emptying) the first chamber 151 and emptying (respectively filling) the second chamber 152. The jack 15 is moreover secured in rotation to the propeller 13 and connected to the latter so that the actuation of the jack 15 (by successive filling and emptying of the first and second chambers) has the effect of modifying the pitch of the propeller 13.

The hydraulic pump 20 can typically be a fixed displacement pump with axial cylinders adapted to supply the jack 15 with pressurized hydraulic fluid when it is actuated by the electric machine 29 via the actuation shaft.

The pump can comprise a body 22 driven in rotation by the propeller 13, a barrel 23 housing a set of pistons 24 circumferentially distributed around the axis of rotation A, each piston 24 comprising a sliding pad, and a plate 26 inclined relative to the axis of rotation A, each sliding pad 25 bearing on the plate 26. In order to allow the operation of this type of pump, one among the inclined plate and the barrel 23 can be fixedly connected to the stator portion of the turbine engine in order to prevent its rotation around the axis of rotation A and the other among the inclined plate 26 and the barrel 23 can be secured in rotation to the actuation shaft 21.

When the hydraulic pump used is not a reversible pump, the hydraulic actuator 11 can further comprise a hydraulic flow rate reversal valve 14, positioned in the hydraulic circuit in order to select the chamber of the jack 15 to be supplied with pressurized hydraulic fluid. The hydraulic flow rate reversal valve 14 is particularly configured to selectively connect either of the chambers of the jack 15 to a pressurized fluid outlet 223 of the hydraulic pump and to a low-pressure fluid return 224, according to the actuation needs of the jack 15 to obtain the desired pitch setting for the propeller.

The hydraulic flow rate reversal valve 14 is controlled by a controller of the pitch change mechanism in order to put the pressurized fluid outlet 223 in fluid communication with the first or second chamber 152 of the jack 15, depending on the direction in which the pitch setting of the propeller needs to be changed. When the pitch setting of the propeller must be modified, the controller controls the electric machine in order to rotate the actuation shaft 21 and drive in rotation the hydraulic pump 20.

This pressurized hydraulic fluid is then brought from the hydraulic pump 20 to the hydraulic flow rate reversal valve 14, which depending on its position (defined by the controller and the propeller pitch setting command) will send this pressurized hydraulic fluid towards either of the chambers of the jack 15. The modification of the pitch caused by the rotational drive of the actuation shaft 21 can then be measured in order to determine a torque command for the electric machine 29 making it possible to achieve the desired pitch.

Figure 4:
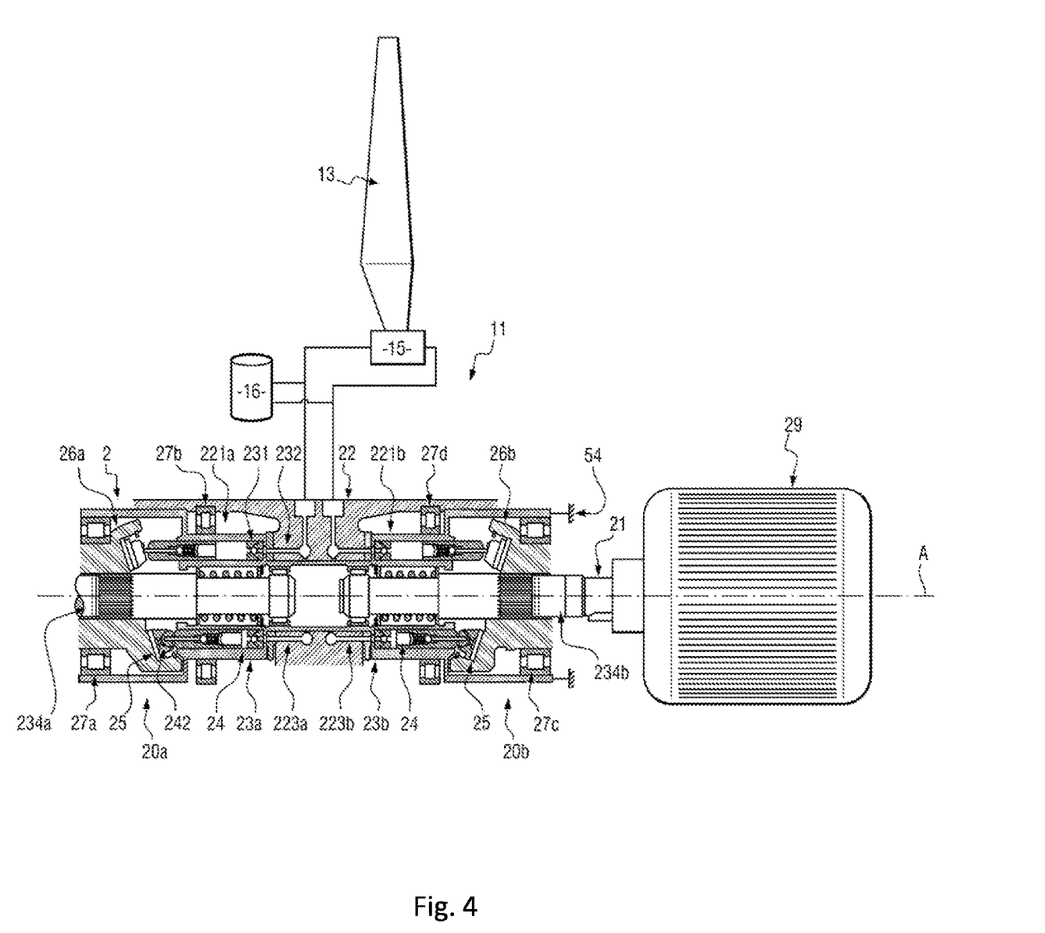
FIG. 4 is a schematic sectional view of one example of a turbine engine comprising a fan or a propeller with variable pitch setting and a pitch change mechanism using a reversible hydraulic pump in accordance with one embodiment.

In one alternative embodiment illustrated in FIG. 4, the hydraulic pump 20 can be a reversible hydraulic pump whose operation is controlled by the direction of rotation of the actuation shaft 21. Such a reversible pump can for example be obtained from a pumping assembly 2 comprising two hydraulic pumps 20*a*, 20*b* with axial pistons adapted to pressurize a hydraulic fluid sharing the same body 22 driven in rotation by the propeller 13. Each of the pumps comprising a barrel 23*a*, 23*b* housed in a cavity 221*a*, 221*b* filled in whole or in part with hydraulic fluid, the barrel 23*a*, 23*b* being fixedly connected to the stator portion of the turbine engine in order to prevent its rotation around the actuation shaft 21. Each of the pumps further comprising a set of cylinders formed in the barrel 23*a*, 23*b* each cylinder housing a piston 24 movable in translation in the cylinder and comprising an intake orifice 242 configured to receive hydraulic fluid coming from the cavity 221*a*, 221*b*, and a discharge orifice 232 configured to send hydraulic fluid to a jack 15 for actuating the propeller, as well as a plate 26*a*, 26*b* inclined relative to the axis of rotation A and secured in rotation to the actuation shaft 21, each piston 24 bearing on a surface of the plate 26*a*, 26*b*. The plate of a first of the pumps 20*a* may comprise an intake lunula 261*a* extending circumferentially relative to the axis of rotation A and configured to allow circulation of the hydraulic fluid from the cavity 221*a* to the cylinders of the first of the pumps 20*a* when the plate 26*a*, 26*b* of said pump 20*a* is driven in a first direction of rotation. The plate of the second of the pumps 20*b* can comprise an intake lunula 261*b* extending circumferentially relative to the axis of rotation A configured to allow circulation of the hydraulic fluid from the cavity 221*b* to the cylinders of the second of the pumps 20*b* when the plate 26*b* of said pump 20*b* is driven in a second direction of rotation opposite to the first direction of rotation.

In one embodiment, the electrohydraulic actuator 11 further comprises a hydraulic fluid tank 16 secured in rotation to the propeller 13. The function of the tank is to guarantee minimum pressure at the pump supply through a check valve and also has the function of avoiding any risk of pressure relief at the discharge through a pressure relief valve in case of overheating.

The pitch change mechanism can further comprise a functional feathering system in case of absence of hydraulic fluid pressure. In one embodiment, the feathering system comprises flyweight-type counterweights.

Figure 5:
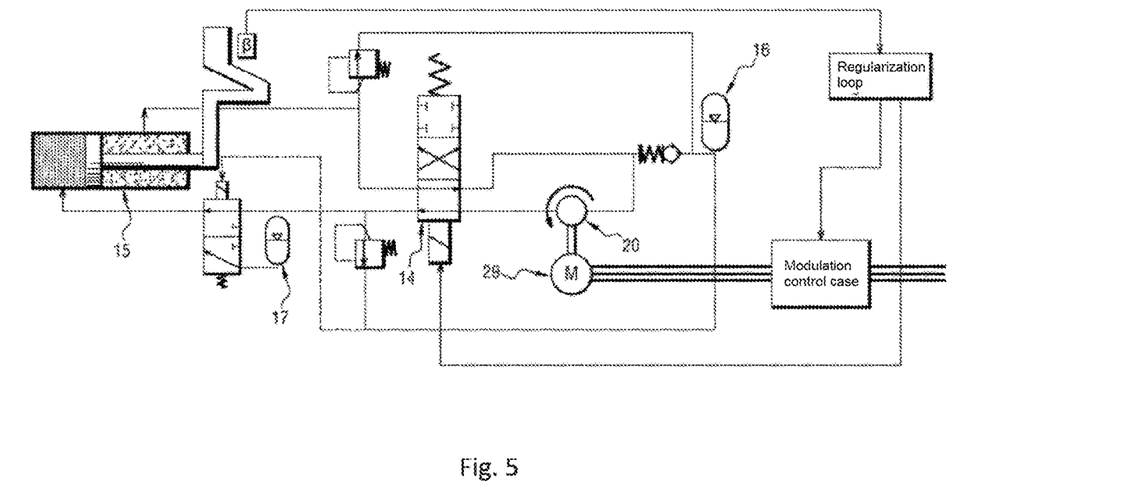
FIG. 5 is a schematic view of a pitch change mechanism for a propeller using a non-reversible hydraulic pump comprising a hydraulic feathering system according to a first embodiment.
Figure 7:
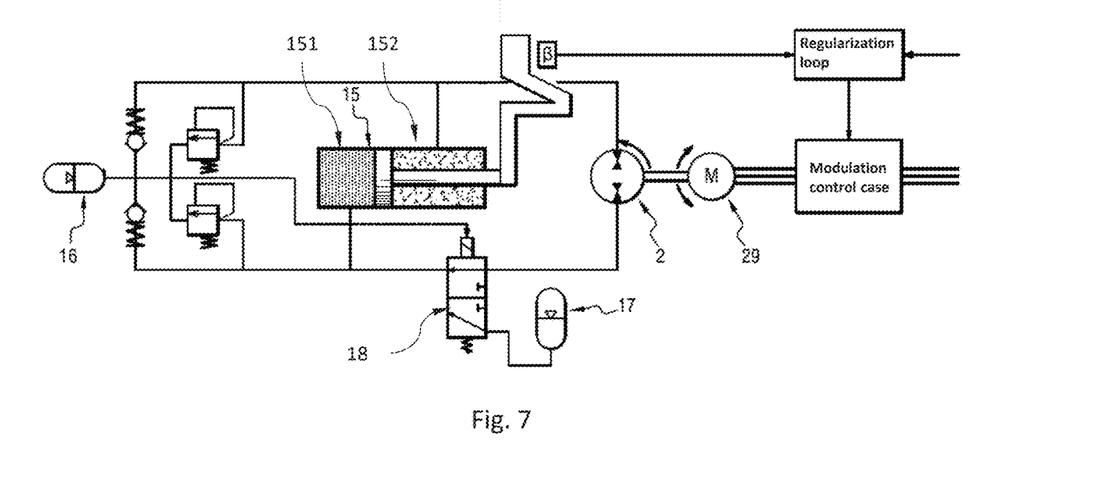
FIG. 7 is a schematic view of a pitch change mechanism for a propeller using a reversible hydraulic pump comprising a hydraulic feathering system according to the first embodiment.

In one variant of embodiment, which can be combined with the counterweights, the pitch change mechanism comprises a hydraulic fluid tank 17, or a high-pressure accumulator, configured to store a pressurized hydraulic fluid, and a valve called controlled safety valve 18 between a first position configured to put the first chamber 151 of the jack 15 in fluid communication with the hydraulic pump 20 and a second position configured to put the first chamber 151 of the jack 15 in fluid communication with the high-pressure accumulator 17 (see FIG. 5 for the case of a non-reversible pump or FIG. 7 for the case of a reversible pump). The high-pressure accumulator 17 can be supplied with pressurized fluid directly by the hydraulic pump by a dedicated circuit (not represented in the figures).

The safety valve 18 thus allows, when it is in its second position, to discharge pressurized hydraulic fluid contained in the high-pressure accumulator 17 towards the first chamber 151 of the jack 15 and thus to feather the propeller 13. The pressure in the high-pressure accumulator 17 is chosen so as to quickly fill the first chamber 151 of the jack 15 in order to allow the feathering of the propeller.

Additionally, the pitch change mechanism can comprise an additional hydraulic fluid tank 16, or low-pressure accumulator, adapted to store pressurized hydraulic fluid and configured to maintain a constant volume of hydraulic fluid in the hydraulic circuit of the pitch change mechanism. The pressure of the hydraulic fluid in the low-pressure accumulator 16 is lower than the pressure of the hydraulic fluid in the high-pressure accumulator 17.

The safety valve 18 is controlled by the pressure of the hydraulic fluid in the hydraulic circuit of the pitch change mechanism. For this purpose, the safety valve 18 can be mounted on one side on a spring (or equivalent) having a predetermined stiffness and be connected, on the other side, to a point in the hydraulic circuit, for example at the low-pressure accumulator 16. In this way, the safety valve 18 passes from the first position to the second position when the pressure in the hydraulic circuit, for example at the low-pressure accumulator 16, is below a predetermined threshold (which is defined by the stiffness of the spring). This piloting thus makes it possible to feather the propeller as soon as a hydraulic fluid leak appears in the hydraulic circuit of the pitch change mechanism. Indeed, in case of a hydraulic fluid leak, the pressure in the hydraulic circuit gradually decreases until reaching the predetermined threshold: the pressure is then no longer sufficient to counter the force applied by the spring on the safety valve 18, which therefore automatically moves to its second position.

The low-pressure accumulator 16 and the high-pressure accumulator 17 can be mounted in a rotating reference frame of the turbine engine, and can in particular be driven in rotation by the propeller 10. Such a configuration thus makes it possible to avoid the need to transfer the oil from an element in the fixed reference frame (stator) to the jack 15 which is in the rotating reference frame (driven in rotation by the propeller).

The pitch change mechanism further comprises means configured to allow discharge of the second chamber 152 in the low-pressure accumulator 16 when the safety valve 18 moves in the second position, that is to say in case of feathering.

To this end, in a first embodiment (see FIG. 5 for the case of a non-reversible pump or FIG. 7 for the case of a reversible pump), the pitch change mechanism can comprise a first pressure relief valve 154 configured to put the first chamber 151 of the jack 15 in fluid communication with the low-pressure accumulator 16 when the pressure of the second chamber 152 of the jack 15 is above a predetermined threshold.

Figure 6:
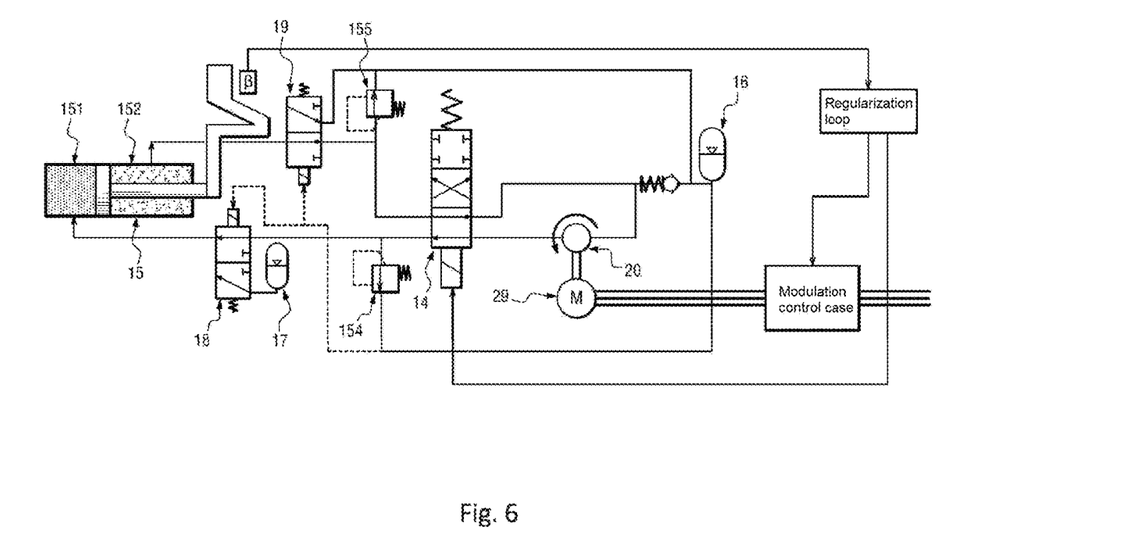
FIG. 6 is a schematic view of a pitch change mechanism for a propeller using a non-reversible hydraulic pump comprising a hydraulic feathering system according to a second embodiment.
Figure 8:
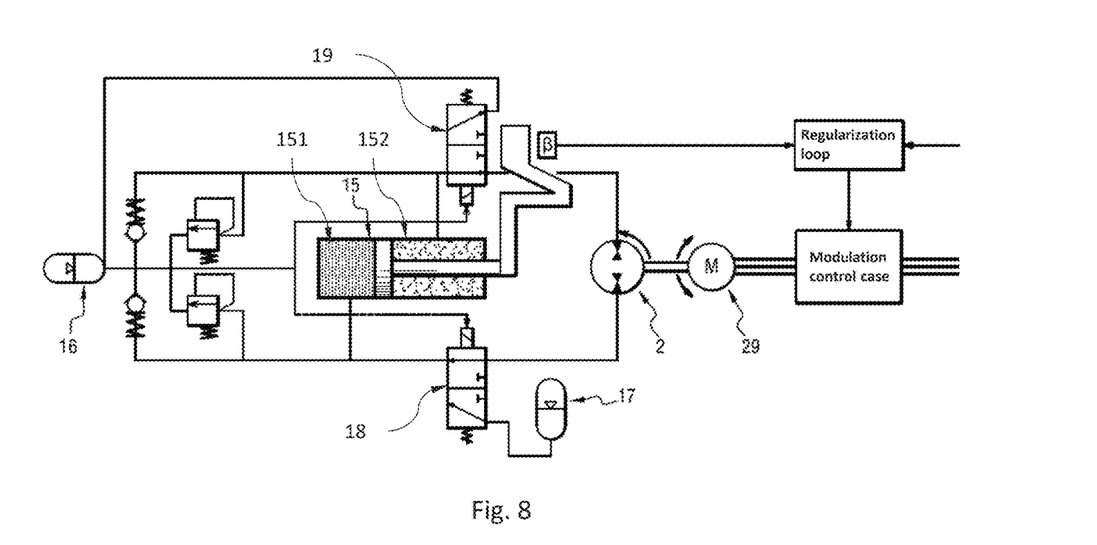
FIG. 8 is a schematic view of a pitch change mechanism for a propeller using a reversible hydraulic pump comprising a hydraulic feathering system according to the second embodiment.

In a second embodiment illustrated in FIG. 6 for the case of a non-reversible pump or in FIG. 8 for the case of a reversible pump, which can be combined with the first one, the pitch change mechanism further comprises an additional valve 19 called movable discharge valve between a first position, in which the discharge valve 19 puts the second chamber 152 of the jack 15 in fluid communication with the hydraulic pump 20, and a second position, in which the discharge valve 19 puts the second chamber 152 of the jack 15 in fluid communication fluid with the low-pressure accumulator 16. The first position of the discharge valve 19 therefore corresponds to a normal operating position, since it allows the return of the hydraulic fluid to the hydraulic pump.

The discharge valve 19 is also controlled by the pressure in the hydraulic circuit, for example taken at the low-pressure accumulator 16. In this way, the safety valve 18 and the discharge valve 19 both automatically pass from the first position to the second position as soon as the pressure in the hydraulic circuit becomes below the predetermined threshold.

The mechanism can further comprise a second pressure relief valve 155 configured to put the second chamber 152 of the jack 15 in fluid communication with the low-pressure accumulator 16 when the pressure in the second chamber 152 of the jack 15 is above a predetermined pressure relief threshold. The second valve thus allows the discharge of the second chamber 152 of the jack 15 in case of pressure relief.

The operation of the hydraulic feathering system is carried out as follows, in the case of a pitch change mechanism comprising both the discharge valve 19 and the first pressure relief valve 154. This is however not limiting, the pitch change mechanism can only comprise the first pressure relief valve 154.

In normal operation (i.e. without leaks), the safety valve 18 and the discharge valve 19 are placed in their first position, thus allowing the selective supply of the first chamber 151 or the second chamber 152 of the jack 15 by the flow rate reversal valve 14, or directly by the hydraulic pump when a reversible pump is used.

In case of a leak, the pressure in the hydraulic circuit of the pitch change mechanism has the effect of reducing the pressure at the low-pressure accumulator 16. The pressure at the inlet of the safety valve 18 and of the discharge valve 19 is then no longer sufficient to resist the force applied by their spring, which has the effect of moving the safety valve 18 and the discharge valve 19 from their first position to their second position. In this configuration, the first chamber 151 of the jack 15 is then put in fluid communication with the high-pressure accumulator 17. The first chamber 151 of the jack 15 therefore fills up quickly with pressurized hydraulic fluid discharged by the high-pressure accumulator 17. Simultaneously, the second chamber 152 of the jack 15 is put in fluid communication with the low-pressure accumulator 16. The filling of the first chamber 151 of the jack 15 has the effect of increasing the pressure in the second chamber 152 of the jack 15, this therefore gradually discharges into the low-pressure accumulator 16 via the discharge valve 19.

The filling of the first chamber 151 of the cylinder also has the effect of moving the piston of the jack 15 and therefore of modifying the pitch setting of the propeller.

It will be noted that, when the pitch change mechanism only comprises the first pressure relief valve 154, it becomes conductive as soon as the second chamber 152 of the jack 15 discharges into the low-pressure accumulator 16.

When the hydraulic pump used in the pitch change mechanism is not reversible, the pitch change mechanism can further comprise a flow rate reversal valve 14 configured to selectively put the hydraulic pump 20 in fluid communication with the first chamber 151 or the second chamber 152 of the jack 15, so as to allow the modification of the pitch of the propeller (see for example in FIG. 8).

However, when a reversible hydraulic pump is used, it is not necessary to use such a flow rate reversal valve, each of the chambers of the jack can be connected to one of the outlets of the hydraulic pump.

This configuration of the pitch change mechanism thus makes it possible to avoid the use of an oil transfer bearing (OTB), thus eliminating the risk of leaks and the associated oil recovery pumps as well as the associated oversizing of the oil tank. The circuit is also independent of the lubrication group. Particularly, the pressure delivered by the hydraulic pump can reach significant levels (of the order of 300 bars), which facilitates the sizing of the jack 15.

It will be noted here that the feathering only includes passive actuation means, the safety valve 18 and the discharge valve 19 being controlled only by the pressure in the hydraulic circuit of the pitch change mechanism. No controller or electrical system is therefore necessary, apart from the electrical means necessary for the control of the flow rate reversal valve and of the electric motor 29.

The invention claimed is:

1. A pitch change mechanism for a propeller, said pitch change mechanism comprising an electrohydraulic actuator comprising:
    a jack for actuating the propeller comprising a first chamber and a second chamber;
    a hydraulic pump adapted to selectively supply the first chamber or the second chamber with a pressurized hydraulic fluid;
    a hydraulic fluid tank configured to store the pressurized hydraulic fluid;
    a valve configured to move between a first position, in which the valve puts the first chamber in fluid communication with the hydraulic pump, and a second position in which the valve puts the first chamber in fluid communication with the hydraulic fluid tank; and
    an additional hydraulic fluid tank, the valve being controlled by a pressure from the additional hydraulic fluid tank;
    wherein a pressure of the hydraulic fluid tank is greater than the pressure of the additional hydraulic fluid tank.

2. The pitch change mechanism according to claim 1, wherein the valve is configured to move from the first position to the second position when the pressure of the additional hydraulic fluid tank is below a predetermined threshold.

3. The pitch change mechanism according to claim 1, wherein the additional hydraulic fluid tank is mounted in a rotating reference frame of a turbine engine.

4. The pitch change mechanism according to claim 1, further comprising at least one of a pressure relief valve and an additional valve configured to put the second chamber in fluid communication with the additional hydraulic tank.

5. The pitch change mechanism according to claim 4, wherein the at least one of the pressure relief valve and the additional valve is controlled by the pressure of the additional fluid tank.

6. The pitch change mechanism according to claim 1, further comprising an additional pressure relief valve configured to put the first chamber in fluid communication with the additional hydraulic fluid tank when the pressure of the first chamber is above a predetermined threshold.

7. The pitch change mechanism according to claim 1, wherein the hydraulic fluid tank is mounted in a rotating reference frame of a turbine engine.

8. The pitch change mechanism according to claim 1, wherein the hydraulic pump comprises a body, an inclined plate and a barrel, wherein the body of the hydraulic pump is in a rotating reference frame of a turbine engine, and one of the inclined plate and the barrel of the hydraulic pump is in a fixed reference frame of the turbine engine.

9. The pitch change mechanism according to claim 8, wherein absent any rotation between the fixed reference frame and the rotating reference frame, a flow rate of the pump is null.

10. The pitch change mechanism according to claim 1, further comprising a flow rate reversal valve configured to selectively put the hydraulic pump in fluid communication with the first chamber or the second chamber.

11. The pitch change mechanism according to claim 1, wherein the hydraulic pump is reversible.

12. A turbine engine comprising a propeller and a pitch change mechanism according to claim 1 configured to actuate a cylinder which is mechanically connected to the propeller.

13. An aircraft comprising at least one turbine engine according to claim 12 connected on the aircraft via a pylon.

14. The turbine engine according to claim 12, further comprising an additional hydraulic fluid tank mounted in a rotating reference frame of the turbine engine, the valve being controlled by a pressure from the additional hydraulic fluid tank.

15. The turbine engine according to claim 12, wherein the hydraulic fluid tank is mounted in a rotating reference frame of the turbine engine.

16. The turbine engine according to claim 12, wherein the hydraulic pump comprises a body, an inclined plate and a barrel, wherein the body of the hydraulic pump is in a rotating reference frame of the turbine engine and one of the inclined plate and the barrel of the hydraulic pump is in a fixed reference frame of the turbine engine.

17. A pitch change mechanism for a propeller, said pitch change mechanism comprising an electrohydraulic actuator comprising:
    a jack for actuating the propeller comprising a first chamber and a second chamber;
    a hydraulic pump adapted to selectively supply the first chamber or the second chamber with a pressurized hydraulic fluid; a hydraulic fluid tank configured to store the pressurized hydraulic fluid; and
    a valve configured to move between a first position, in which the valve puts the first chamber in fluid communication with the hydraulic pump, and a second position in which the valve puts the first chamber in fluid communication with the hydraulic fluid tank;
    wherein the hydraulic pump comprises a body, an inclined plate and a barrel, wherein the body of the hydraulic pump is in a rotating reference frame of a turbine engine, and one of the inclined plate and the barrel of the hydraulic pump is in a fixed reference frame of the turbine engine;
    wherein absent any rotation between the fixed reference frame and the rotating reference frame, a flow rate of the pump is null.

18. A pitch change mechanism for a propeller, said pitch change mechanism comprising an electrohydraulic actuator comprising:
    a jack for actuating the propeller comprising:
    a first chamber and a second chamber;
    a hydraulic pump adapted to selectively supply the first chamber or the second chamber with a pressurized hydraulic fluid;
    a hydraulic fluid tank configured to store the pressurized hydraulic fluid;
    a valve configured to move between a first position, in which the valve puts the first chamber in fluid communication with the hydraulic pump, and a second position in which the valve puts the first chamber in fluid communication with the hydraulic fluid tank; and a flow rate reversal valve configured to selectively put the hydraulic pump in fluid communication with the first chamber or the second chamber.

\* \* \* \* \*